United States Patent
Kim et al.

(10) Patent No.: US 7,625,429 B2
(45) Date of Patent: Dec. 1, 2009

(54) ZEOLITE ADSORBENT FOR DESULFURIZATION AND METHOD OF PREPARING THE SAME

(75) Inventors: Soon-ho Kim, Seoul (KR); Hyun-chul Lee, Yongin-si (KR); Yulia Potapova, Yongin-si (KR); Eun-duck Park, Incheon-si (KR); Eun-yong Ko, Jeju-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 445 days.

(21) Appl. No.: 11/336,836

(22) Filed: Jan. 23, 2006

(65) Prior Publication Data

US 2006/0162557 A1 Jul. 27, 2006

(30) Foreign Application Priority Data

Jan. 24, 2005 (KR) ............. 10-2005-0006350

(51) Int. Cl.
*H01M 8/06* (2006.01)
*B01J 20/18* (2006.01)

(52) U.S. Cl. ............... 95/135; 95/902; 423/242.1; 502/79; 585/820

(58) Field of Classification Search .......... 95/135, 95/900, 902; 96/108; 423/700, 242.1, 244.01, 423/244.04, 244.11, DIG. 21; 502/60, 64, 502/79; 429/12; 208/208 R, 247; 585/820
See application file for complete search history.

(56) References Cited

U.S. PATENT DOCUMENTS

| | | | | |
|---|---|---|---|---|
| 4,358,297 A | * | 11/1982 | Eberly, Jr. ............. | 95/136 |
| 5,146,039 A | * | 9/1992 | Wildt et al. ............. | 585/820 |
| 6,764,535 B1 | * | 7/2004 | Lansbarkis et al. ....... | 96/132 |
| 6,875,410 B2 | | 4/2005 | Satokawa et al. | |
| 6,942,847 B2 | | 9/2005 | Harbuzaru et al. | |
| 2001/0014304 A1 | | 8/2001 | Satokawa et al. | |
| 2004/0209759 A1 | * | 10/2004 | Harbuzaru et al. ....... | 502/60 |
| 2006/0043001 A1 | * | 3/2006 | Weston et al. ........... | 208/208 R |

FOREIGN PATENT DOCUMENTS

EP 0 377 291 A1 12/1989
JP 2-221115 9/1990

(Continued)

OTHER PUBLICATIONS

Office Action issued in Chinese Patent Application No. 200610004856.1 on Jul. 27, 2007.

(Continued)

*Primary Examiner*—Frank M Lawrence
(74) *Attorney, Agent, or Firm*—Stein, McEwen & Bui, LLP

(57) ABSTRACT

A zeolite adsorbent for desulfurization and a method of preparing the same. More particularly, a zeolite adsorbent for desulfurization in which the relative crystallinity of Y zeolite that is ion exchanged with Ag is 45% to 98%, and a method of preparing the same. The zeolite adsorbent for desulfurization has excellent crystallinity over the known zeolite adsorbent for desulfurization, and thus has better performance of adsorbing sulfur compounds though it contains less Ag. Accordingly, when the sulfur compounds of a fuel gas are removed by employing the zeolite adsorbent for desulfurization, a desulfurizing device that is bettereven with less cost can be constructed.

19 Claims, 7 Drawing Sheets

FOREIGN PATENT DOCUMENTS

| | | |
|---|---|---|
| JP | 3-81232 | 4/1991 |
| JP | 8-159413 | 6/1996 |
| JP | 9-168724 | 6/1997 |
| JP | 10-237473 | 9/1998 |
| JP | 2002-66313 | 3/2002 |
| JP | 2003-20489 | 1/2003 |
| JP | 2003-277047 | 10/2003 |
| JP | 2004-149361 | 5/2004 |
| JP | 2004-168648 | 6/2004 |
| JP | 2004-217518 | 8/2004 |
| JP | 2004-225410 | 8/2004 |
| JP | 2004-228016 | 8/2004 |
| JP | 2006-044965 A * | 2/2006 |

OTHER PUBLICATIONS

Office Action issued by Chinese Patent Office in Chinese Patent Application No. 2006-15628 on Feb. 27, 2008.

Office Action issued by Chinese Patent Office in Chinese Patent Application No. 2006-15628 on Aug. 11, 2008.

Reference AA (6,942,847 B2) is substantially equivalent to Reference AK (JP 2004-217518).

Reference AB (EP 0 377 291 A1) is substantially equivalent to Reference AC (JP 2-221115).

* cited by examiner

ZEOLITE ADSORBENT FOR DESULFURIZATION AND METHOD OF PREPARING THE SAME

CROSS-REFERENCE TO RELATED APPLICATIONS

This application claims the benefit of Korean Patent Application No. 2005-6350, filed on Jan. 24, 2005, in the Korean Intellectual Property Office, the disclosure of which is incorporated herein in its entirety by reference.

BACKGROUND OF THE INVENTION

1. Field of the Invention

Aspects of the present invention relate to a zeolite adsorbent for desulfurization, and more particularly, to a zeolite adsorbent for desulfurization that is excellent for removing sulfur compounds, such as tetrahydrothiophene (THT) at ambient temperature.

2. Description of the Related Art

A fuel cell is a generation system that directly converts chemical energy of hydrogen and oxygen contained in hydrocarbon-based material, such as methanol, ethanol and natural gas, to electrical energy.

Such a fuel cell is typically provided with a stack, a fuel processor (FP), a fuel tank, a fuel pump. The stack makes up the main body of a fuel cell, and has a structure in which several or dozens of unit cells, each made up of a membrane electrode assembly (MEA) and a separator (or bipolar plate), are stacked. The fuel pump feeds a fuel from a fuel tank into a fuel processor, and the fuel processor reforms and purifies the fuel to generate hydrogen and feeds the hydrogen to the stack. The stack receives the hydrogen and electro-chemically reacts the hydrogen with oxygen to generate electrical energy.

A reformer and a water-gas shift reactor in the fuel processor reform hydrocarbons by employing catalysts. The hydrocarbons to be reformed typically contain sulfur compounds, and the above-mentioned catalysts, as well as an anode catalyst of a membrane electrode assembly, are easily poisoned by sulfur compounds. Accordingly, it is required that the sulfur compounds be removed before feeding the hydrocarbons to the reforming process. Thus, the hydrocarbons should go through a desulfurization process before entering the reforming process (see FIG. 1).

Particularly, city gas (i.e., gas from a municipal utility) may be used as a feedstock of fuel cells. City gas typically contains about a few ppm of sulfur compounds that are added to the gas to function as odorants. Typically, the sulfur compounds added to city gas are tertiary butyl mercaptan (TBM) and tetrahydrothiophene (THT). As discussed above, it is necessary to remove the sulfur compounds in order to use the city gas in fuel cells.

A method of removing sulfur compounds can employ a hydrodesulfurization (HDS) process or an adsorbent. Although the hydrodesulfurization process is reliable, the process requires high temperatures of 300° C. to 400° C., is complicated to operate and thus is more suitable to large scale plants than to small scale devices.

To remove sulfur compounds such as TBM, THT, etc., in a fuel gas, a method employing an adsorbent is more suitable. The method employing an adsorbent passes a fuel gas through an adsorbent made of activated carbon, metal oxide or zeolite, etc., to remove the sulfur compounds. When the adsorbent becomes saturated with sulfur compounds, so that it is no longer able to remove additional sulfur compounds, replacement or regeneration of the adsorbent is required. The amount of needed adsorbent and the replacing cycle of the adsorbent are largely influenced by the adsorptivity of the adsorbent, and thus an adsorbent having high adsorptivity is preferred.

Various adsorbents have been proposed. JP 1994-306377 B discloses a zeolite ion-exchanged with multivalent metal ions to remove mercaptans contained in city gases. However, the zeolite could be applied to mercaptans only.

Further, it is known that THT is more difficult to remove than TBM. A zeolite containing Ag has the ability to remove THT.

JP 10-237473 B discloses a Na-X-zeolite in which the pore size is at least 5 Å, as an adsorbent. The adsorbent shows excellent adsorptivity at ambient temperature; however, when it is exposed to moisture the adsorptivity is drastically reduced.

US 2004-57890 A discloses an adsorbent that shows relatively excellent adsorptive performance at ambient temperature even when exposed to moisture. The adsorbent is obtained by ion-exchanging X zeolite, Y zeolite or beta zeolite with transition metal elements, such as silver, copper, etc.

However, for the zeolite adsorbents disclosed up to the present date, the crystallinity of the zeolites has not been emphasized, and insufficient attention has been paid to the relationship between crystallinity and improved performance of zeolite adsorbents.

SUMMARY OF THE INVENTION

Aspects of the present invention provide a zeolite adsorbent for desulfurization that is capable of removing sulfur compounds efficiently at ambient temperature without requiring more than a small amount of silver.

Aspects of the present invention also provide a method of preparing the zeolite adsorbent for desulfurization.

Aspects of the present invention also provide a method of desulfurizing to remove sulfur compounds by employing the zeolite adsorbent for desulfurization.

Aspects of the present invention also provide a desulfurizing device comprising the zeolite adsorbent for desulfurization.

Aspects of the present invention also provide a fuel cell system comprising the desulfurizing device.

According to an aspect of the present invention, there is provided a zeolite adsorbent for desulfurization comprising a Y zeolite that is ion exchanged with Ag and in which the relative crystallinity of the Y zeolite that is ion exchanged with Ag is 45% to 98% as compared to the crystallinity of a Y zeolite that is not ion exchanged.

According to another aspect of the present invention, there is provided a method of preparing the zeolite adsorbent for desulfurization comprising:

(a) once ion exchanging Y-zeolite with silver ion; and (b) calcining the Y-zeolite ion-exchanged with silver ion.

According to still another aspect of the present invention, there is provided a method of desulfurizing to remove sulfur compounds by passing a fuel gas through the zeolite adsorbent for desulfurization.

According to still yet another aspect of the present invention, there is provided a desulfurizing device comprising the zeolite adsorbent for desulfurization.

According to still another aspect of the present invention, there is provided a fuel cell system comprising the zeolite adsorbent for desulfurization.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
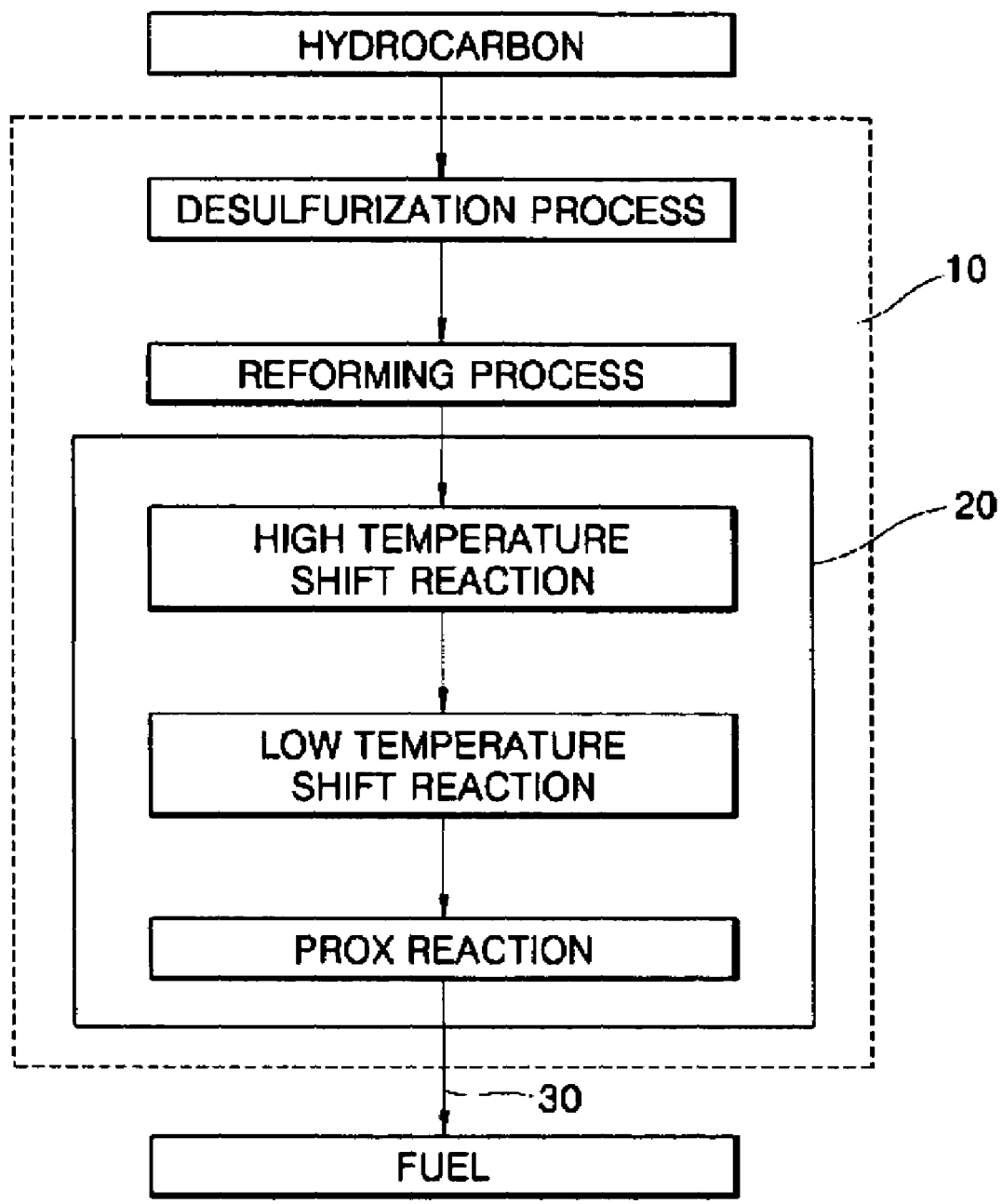
FIG. 1 is a flow chart showing generally the constitution of a fuel processor.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The city gas that is a promising feedstock for a fuel cell obligatorily includes sulfur compounds, such as THT or TBM. As described above, these sulfur compounds are typically added to city gas as odorants. Petroleum, which is another possible feedstock, typically includes mercaptans, aromatic heterocyclic compounds comprising sulfur, and disulfides, etc. in addition to the sulfur compounds described above.

Because of the likelihood that any of these sulfur compounds will poison the reformer catalyst and the anode catalyst of a membrane electrode assembly if they are not removed, an adsorbent for removing the sulfur compounds contained in the feedstock for a fuel cell ought to be able to remove all of the sulfur compounds described above.

More particularly, aromatic heterocyclic compounds containing sulfur include thiophene, thiophenol, alkylthiophene and benzothiophene. The compounds include, particularly, 2-methylthiophene, 3-methylthiophene, ethylthiophene, dimethylthiophene, trimethylthiophene, benzothiophene, dibenzothiophene, methylbenzothiophene, and dimethylbenzothiophene. However, the compounds are not limited to these examples.

Further, the mercaptans include 1-ethanethiol, 2-propanethiol, 2-butanethiol, 2-methyl-2-propanethiol, pentanethiol, hexanethiol, heptanethiol, octanethiol, nonanethiol and thiophenol. However, the mercaptans are not limited to these examples.

According to an aspect of the present invention, the zeolite adsorbent for desulfurization that can adsorb the above-mentioned sulfur compounds is a Y zeolite that is ion-exchanged with Ag ion and that has a relative crystallinity of 45% to 98%. The present inventors found that the performance of adsorbing a sulfur compound of a zeolite adsorbent for desulfurization depends more on the crystallinity of the ion-exchanged zeolite, than on the amount of Ag that is present in the zeolite.

The zeolite used as the starting material in preparing the zeolite adsorbent for desulfurization according to the present invention includes Y-zeolite, and, more particularly Na—Y-zeolite or H—Y-zeolite. The starting zeolite is ion-exchanged with Ag ion thereby to substitute a part of the Na or H with Ag.

What is meant by the relative crystallinity of the ion-exchanged zeolite as described herein is the crystallinity as compared with the crystallinity of the Y-zeolite that is not ion exchanged. The crystallinity of non-ion-exchanged Y-zeolite is deemed to be 100%. During an ion exchange process, the crystallinity of the zeolite decreases, and therefore, the relative crystallinity of an ion-exchanged zeolite is less than 100%.

As described herein, when the relative crystallinity of the zeolite adsorbent for desulfurization according to an aspect of the present invention is 45% to 98%, the performance of adsorbing sulfur compounds may be excellent. When the relative crystallinity of the zeolite adsorbent for desulfurization is less than 45%, the performance of adsorbing sulfur compounds may be insufficient. A zeolite adsorbent for desulfurization in which the relative crystallinity exceeds 98% may be difficult to prepare.

Further, the amount of Ag may be 2% to 15% by weight of the zeolite adsorbent for desulfurization. When the amount of Ag is less than 2% by weight, the performance of the adsorbent may be insufficient even though the crystallinity of the adsorbent is high. When the amount of Ag exceeds 15% by weight, the adsorbent becomes non-economical because noble metal silver is very expensive.

Further, the amount of Ag ion as a percentage of the total cations attached to the zeolite constituting backbone may be 1% to 40%. When the percentage of Ag ion is less than 1%, the performance of the adsorbent in adsorbing sulfur compounds becomes insufficient. When the percentage of Ag ion exceeds 40%, it is economically disadvantageous.

The zeolite adsorbent for desulfurization can adsorb the sulfur compounds well, even at ambient temperatures and ambient pressure. Accordingly, it is not necessary to further apply heat or to remove heat, or to elevate or lower pressure for adsorption.

The zeolite adsorbent for desulfurization according to the present invention can be prepared as follows.

First, the Y-zeolite is once ion-exchanged with Ag ion. What is meant by "once ion-exchanged" is that only one process of ion exchange is carried out on the Y-zeolite. Ag ion exchanged Y-zeolite is referred to herein as "Ag—Y-zeolite." When the term "Ag—Y-zeolite" is used herein in reference to a method of desulfurizing, a desulfurizing device or a fuel cell comprising the desulfurization device according to aspects of the present invention, the term refers to Ag—Y-zeolite that is a Y-zeolite that has been ion exchanged with silver and that has a relative crystallinity of 45% to 98%, in comparison to a Y-zeolite that has not been ion exchanged.

In performing the ion exchanging, Y-zeolite is added to a solution in which Ag is ionized. The concentration of Ag ion in the ionized solution may be 0.01M to 1M, for example, but is not particularly limited to these. The Ag-ionized solution can be prepared by any known method, such as, for example, by dissolving silver salts such as $AgNO_3$, silver acetate, silver sulfate, and other silver salts that are easily dissociated in distilled water.

The Y-zeolite is added to the Ag-ionized solution preferably in the amount of 4 g of Y-zeolite per 100 ml of the solution based on a 0.1M solution, although the relative amount of the Y-zeolite is not particularly limited.

The solution, in which the Y-zeolite is added, is agitated, thereby accomplishing the ion exchanging.

When the ion exchanging time is too short, the ion exchanging is insufficient. When the ion exchanging time is too long, the crystallinity of Ag—Y-zeolite may become worse. Considering this, the ion exchanging time may be 1 to 12 hours.

The temperature for the ion exchanging may be 20° C. to 90° C. When the temperature is less than 20° C., the ion exchanging is insufficient. When the temperature exceeds 90° C., the crystallinity of the zeolite becomes worse.

Preferably, the ion exchanging is performed only once. When the ion exchanging is performed two or more times, the crystallinity of the resulting Ag—Y-zeolite may become worse.

The ion exchanged Ag—Y-zeolite is separated by usual known methods, such as filtering, centrifugation, etc., and then is washed once or repeatedly by employing deionized water. The washed Ag—Y-zeolite is dried at 100° C. to 200° C. for 5 to 20 hours.

The drying procedure is significant because it may have an affect on the crystallinity of the finally resulting Ag—Y-zeolite. That is, when moisture is not sufficiently removed during the drying procedure, the crystallinity becomes worse. Accordingly, moisture stuck to surfaces should be completely removed by fully drying.

When the drying temperature is less than 100° C., water is not sufficiently evaporated and thus drying may be insufficient. When the drying temperature exceeds 200° C., it is economically disadvantageous. Also, when the drying time is shorter than 5 hours, drying may be insufficient. When the drying time is longer than 20 hours, it is economically disadvantageous.

The sufficiently dried Ag—Y-zeolite is calcined in a nitrogen or air atmosphere. The calcining temperature may be 350° C. to 500° C. When the calcining temperature is less than 350° C., water adsorbed on surfaces is not sufficiently removed, and thus the crystallinity of the Ag—Y-zeolite becomes worse. When the calcination temperature exceeds 500° C., even lattice water is evaporated and the backbone structure of the resulting Ag—Y-zeolite can be collapsed.

The calcining time may be 2 to 12 hours. When the calcining time is shorter than 2 hours, water adsorbed on surfaces is not sufficiently removed, and thus the crystallinity of the Ag—Y-zeolite becomes worse. When the calcining time is longer than 12 hours, it is economically disadvantageous.

The Ag—Y-zeolite may also be prepared by further carrying out an operation of calcining Y-zeolite in a nitrogen or air atmosphere before the ion exchanging takes place. Zeolite that is exposed to air absorbs moisture from the air, which can slowly lower the crystallinity of the zeolite. The absorbed moisture can be removed by calcining the zeolite, and thus the original crystallinity can be recovered. Accordingly, further incorporation of calcining procedures before ion exchanging can contribute to improvements in crystallinity of the finally resulting Ag—Y-zeolite.

Here, the temperature of calcining before ion exchanging may be 350° C. to 500° C. When the calcining temperature is less than 350° C., water adsorbed on surfaces is not sufficiently removed, and thus the crystallinity of Ag—Y-zeolite becomes worse. When the calcining temperature exceeds 500° C., even lattice water is evaporated and the backbone structure of the resulting Ag—Y-zeolite can be collapsed.

Further, the time for calcining before ion exchanging may be 2 to 12 hours. When the calcining time is shorter than 2 hours, water adsorbed on surfaces is not sufficiently removed, and thus the crystallinity of Ag—Y-zeolite may become worse. When the calcining time is longer than 12 hours, it is economically disadvantageous.

Figure 2:
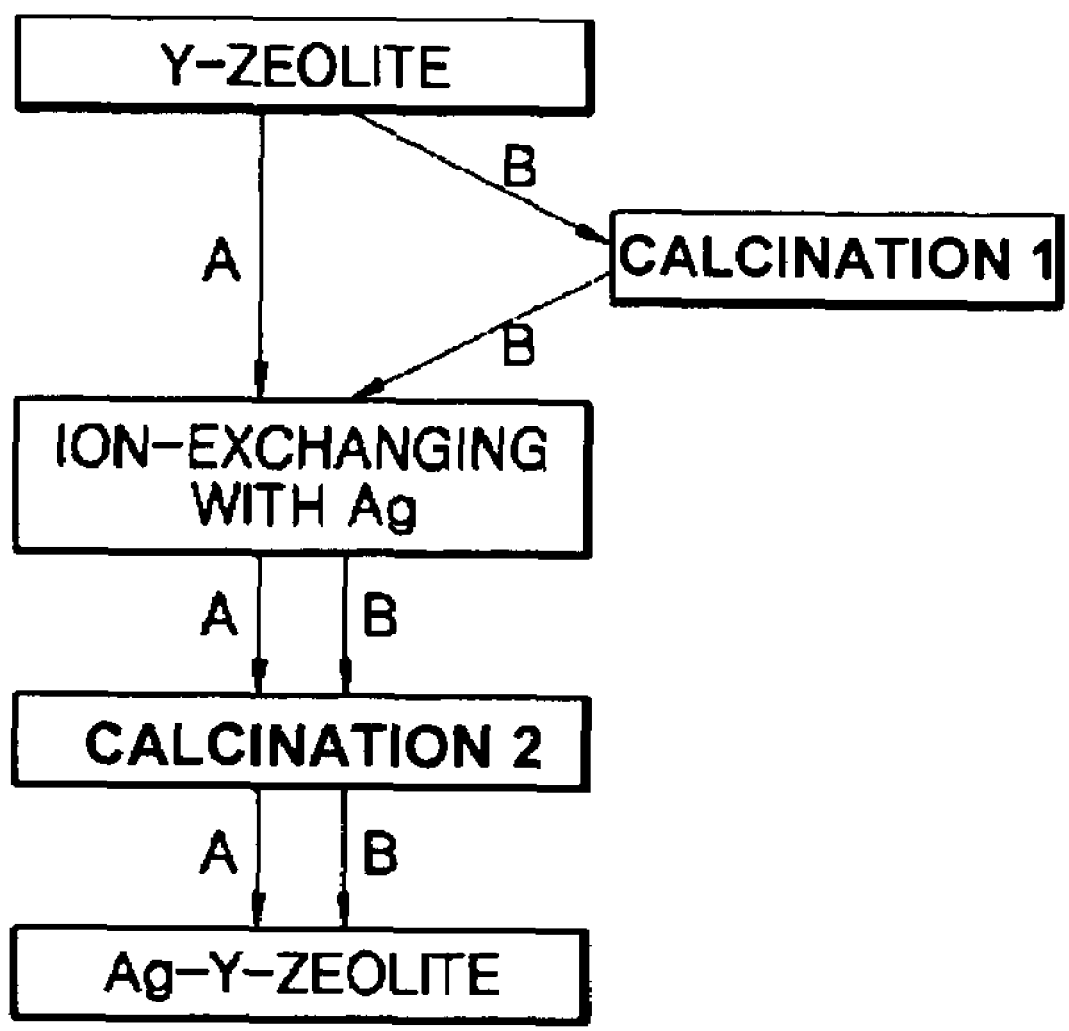
FIG. 2 is a flow chart showing generally a method of preparing a zeolite adsorbent for desulfurization according to an embodiment of the present invention.

The two methods of preparing Ag—Y-zeolite mentioned above are summarized in FIG. 2. Ag—Y-zeolite according to an aspect of the present invention may be prepared via the A pathway of FIG. 2, which includes a calcining procedure only after ion exchanging ("Calcination 2" in FIG. 2) or may be prepared via the B pathway which further comprises a calcining procedure on the Y-zeolite before the ion exchanging takes place ("Calcination 1" in FIG. 2).

The method of desulfurizing by employing the Ag—Y-zeolite is effected by passing a fuel gas comprising sulfur compounds through the Ag—Y-zeolite according to aspects of the present invention. In particular, as described above, the Ag—Y-zeolite is a Y-zeolite that has been ion exchanged with silver and that has a relative crystallinity of 45% to 98%, in comparison to a Y-zeolite that has not been ion exchanged. The sulfur compounds that may be adsorbed include, but are not limited to, thiophenes, mercaptans and disulfides. Further, the suitable range of temperatures to desulfurize by employing the Ag—Y-zeolite is 15° C. to 200° C. Through the method, even very low concentrations of sulfur compounds can be removed at ambient temperature, as well as at temperatures higher than ambient temperature.

Further, the method of desulfurizing according to an aspect of the present invention shows excellent ability to remove sulfur compounds even at ambient temperature and pressure. Elevating or reducing the temperature or pressure is not required. By using the zeolite adsorbent for desulfurization according to aspects of the present invention, it is anticipated that a product stream can be obtained in which the concentration of sulfur compounds at exit is less than 0.1 ppm.

A desulfurizing device comprising the Ag—Y-zeolite can be prepared. The Ag—Y-zeolite can be used by being charged as a fixed bed, or as a fluidized bed in the desulfurizing device, but the ways of using the Ag—Y-zeolite are not limited to these and the Ag—Y-zeolite can be used in various ways known to the art. Moreover, the desulfurizing device may be further prepared by employing fixed-bed columns that are easy to prepare, set and operate, and are simple.

Further, a fuel cell system employing the desulfurizing device can be prepared.

A fuel cell system typically comprises a fuel processor and a fuel cell stack. As shown in FIG. 1, hydrocarbon fuel to be used in a fuel cell stack may travel through a fuel processor 10 that carries out processes of desulfurization, reforming and CO removal in a desulfurizing device, a reformer and a CO-removing device, respectively. The CO-removing device may be one that carries out the processes 20 of a high temperature shift reaction, a low temperature shift reaction and a PROX reaction, as shown in FIG. 1, but the fuel cell system according to an aspect of the present invention is not limited to this embodiment, and any device for removal of CO may be used, including, for example, a catalytic system.

The desulfurizing device plays a role in preventing catalysts in a fuel reformer from being poisoned due to the sulfur compounds in feedstock. Accordingly, the desulfurizing device may be located upstream of a reformer of fuel gas. Further, the desulfurizing device may comprise the Ag—Y-zeolite charged as a fixed bed, as described above.

Further, an improved performance of a fuel cell system can be obtained by further providing a guard bed at the front end of the desulfurizing device. The guard bed is preferably set in a fixed bed.

The guard bed plays a role in providing an initial removal of sulfur compounds contained in feedstock, and also plays a role in protecting the zeolite adsorbent in the desulfurizing device by removing other undesirable materials from the feedstock.

The material charging the guard bed may be at least one selected from the group consisting of activated carbon, activated alumina, silica gel, zeolite, clay, diatomous earth, porous adsorbent and mixtures thereof, and the material may occupy at least 15% of the guard bed.

The present invention will be described in greater detail with reference to the following examples. The following examples are for illustrative purposes and are not intended to limit the scope of the invention.

EXAMPLES

The Amount of Adsorbed THT

An adsorption method was employed in order to determine the amount of adsorbed THT. The adsorbed amount was detected by using a pulsed flame photometric detector (PFPD). In the present invention, the concentration of THT was detected at the rear end of the adsorbent while gases containing 100 ppm of THT passed through in 0.030 g of a zeolite sample at a flow rate of 50 ml/min.

When testing adsorbents using an input containing THT and using PFPD for detection, no THT was detected at the exit of the adsorbent at first, indicating that all of the initial THT was adsorbed on the adsorbent. However, the adsorbent was gradually saturated as the testing progressed and then THT began to be detected at the exit. Herein, the point at which THT begins to be detected at the exit is referred to as the breakthrough point. As the procedure continued, more THT was detected at the exit, and finally all injected THT was detected, indicating a point at which little or no adsorption was taking place.

From such procedures, it can be assumed that adsorbed amount corresponds to the difference between the amount of the injected THT and the amount of the detected THT. Thus, based on that, the amount of the adsorbed THT can be calculated.

In the examples herein, the amount (g) of adsorbed THT per 1 g of the adsorbent was determined by employing the adsorption method.

Crystallinity

The relative crystallinity of prepared Ag—Y-zeolite was determined with reference to the crystallinity of Na—Y-zeolite. That is, the crystallinity of prepared Ag—Y-zeolite was determined as a relative percentage, with the crystallinity of Na—Y-zeolite deemed to be 100%.

Figure 5:
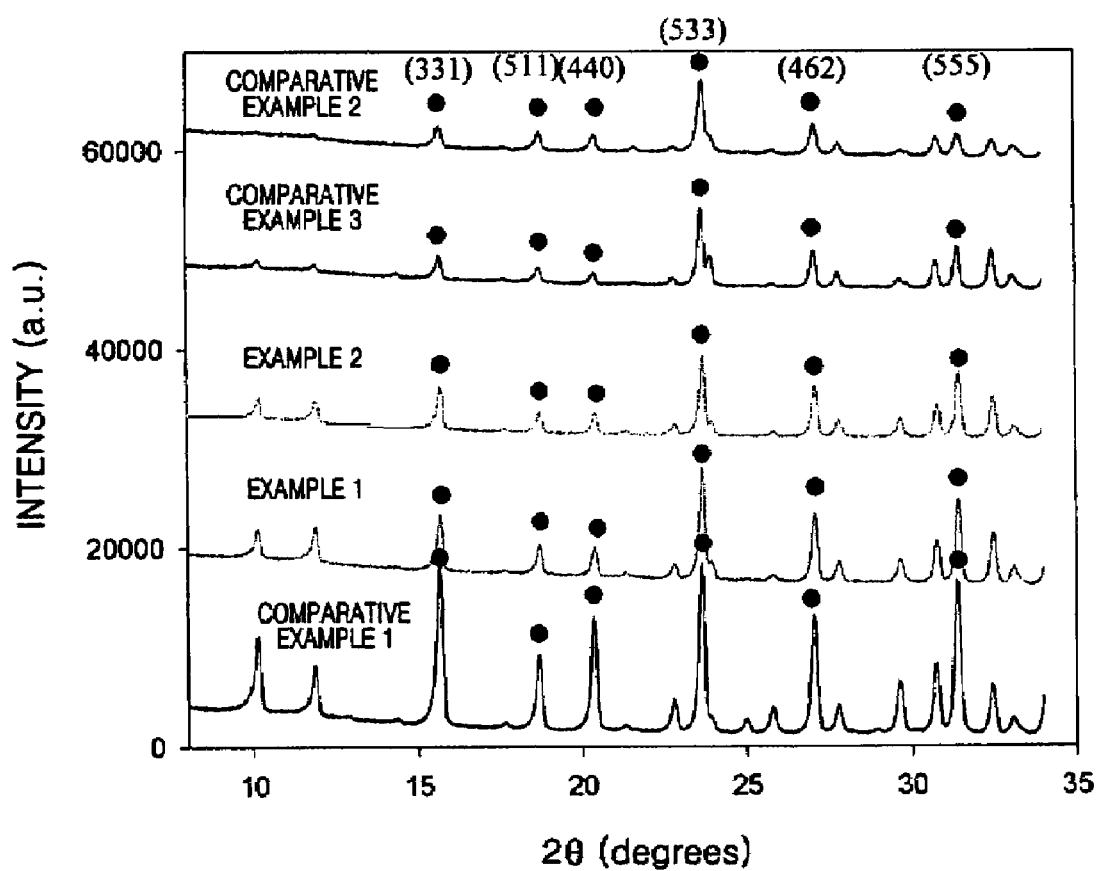
FIG. 5 is a graph showing the results of the XRD analysis for the Y-zeolite according to Examples of the present invention and Comparative Examples.

The relative crystallinity was determined with the XRD patterns of Examples and Comparative Examples by employing ASTM D3906-03, as shown in FIG. 5.

Example 1

2 g of Na—Y-zeolite were calcined for 4 hours while maintaining a temperature of 400° C. Then, the Na—Y-zeolite calcined as above was added to 50 ml of a 0.1M AgNO₃ solution, and the mixture was stirred for 5 hours to perform ion exchanging with maintaining the temperature at 60° C. The ion exchanged Ag—Y-zeolite was filtered and washed with deionized water.

The washed Ag—Y-zeolite was dried for 16 hours while maintaining the temperature at 110° C. The dried Ag—Y-zeolite was added to a heating furnace and calcined for 4 hours while maintaining the temperature at 400° C.

The crystallinity of the Ag—Y-zeolite prepared as described above was determined as 53.9%. Further, the results from determining the amount of other components and from adsorption are summarized in Table 1 below.

Comparative Example 1

The amount of components was determined by employing the Na—Y-zeolite used in preparing the Ag—Y-zeolite of Example 1. The adsorption results are summarized in Table 1 below.

TABLE 1

|  | Silica/Alumina | Na (% by weight) | Ag (% by weight) | Cation % | | Crystallinity, (Relative %) | Adsorbed amount (g-THT/g-adsorbent) |
| --- | --- | --- | --- | --- | --- | --- | --- |
|  |  |  |  | Na | Ag |  |  |
| Ex. 1 | 5.42 | 5.12 | 11.71 | 61.93 | 38.07 | 53.9 | 0.263 |
| Comp. Ex. 1 | 5.50 | 6.86 | — | 100.00 | 0.00 | 100.0 | 0.166 |

Herein, ICP refers to induced coupled plasma, and the quantitative analysis for each element can be performed by the method as described above.

As can be seen as described above, in terms of the crystallinity, the crystallinity for Comparative Example 1 is higher than that for Example 1, however, in terms of the amount of Ag, the adsorbent of Comparative Example 1 never contained Ag, while the adsorbent of Example 1 contained 38.07% of Ag based on cations, and thus it can be found that adsorbed amount of Example 1 is much more than that of Comparative Example 1. This suggests that Ag should be necessarily contained as a cation in zeolite in order to increase the adsorbed amount of sulfur compounds.

Figure 3A:
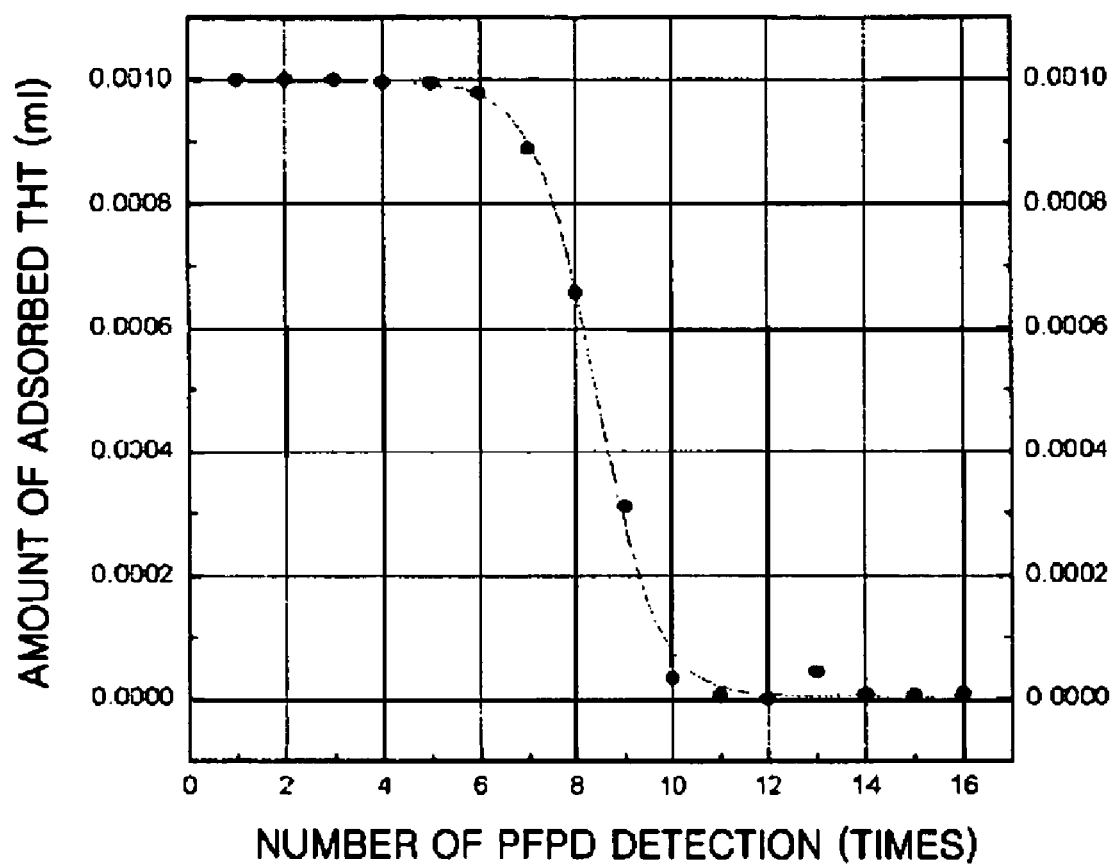
FIG. 3A is a graph showing the results of an adsorption experiment for a zeolite adsorbent for desulfurization according to Example 1 of the present invention.
Figure 3B:
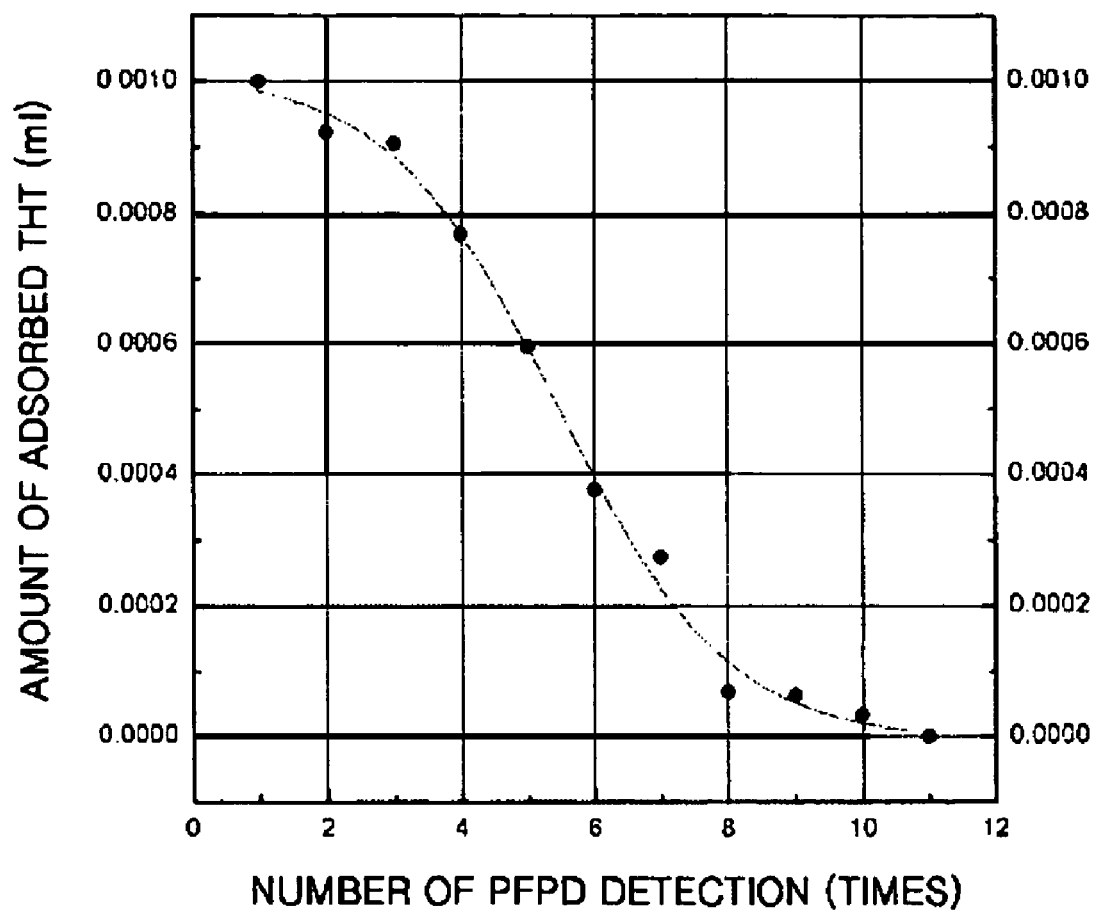
FIG. 3B is a graph showing the results of an adsorption experiment for Na—Y-zeolite according to Comparative Example 1.

Further, the adsorption results performed for these adsorbents are shown in FIGS. 3A and 3B. As can be seen in the graph of FIG. 3A, it can be found that the breakthrough point for the adsorbent in Example 1 appears as adsorption progresses. Meanwhile, as can be seen in the graph of FIG. 3B, it can be found that, for the adsorbent of Comparative Example 1, the breakthrough point appears earlier than for Example 1. This suggests that for Example 1, the available period of the adsorbent layer is much longer than for Comparative Example 1.

Figure 4A:
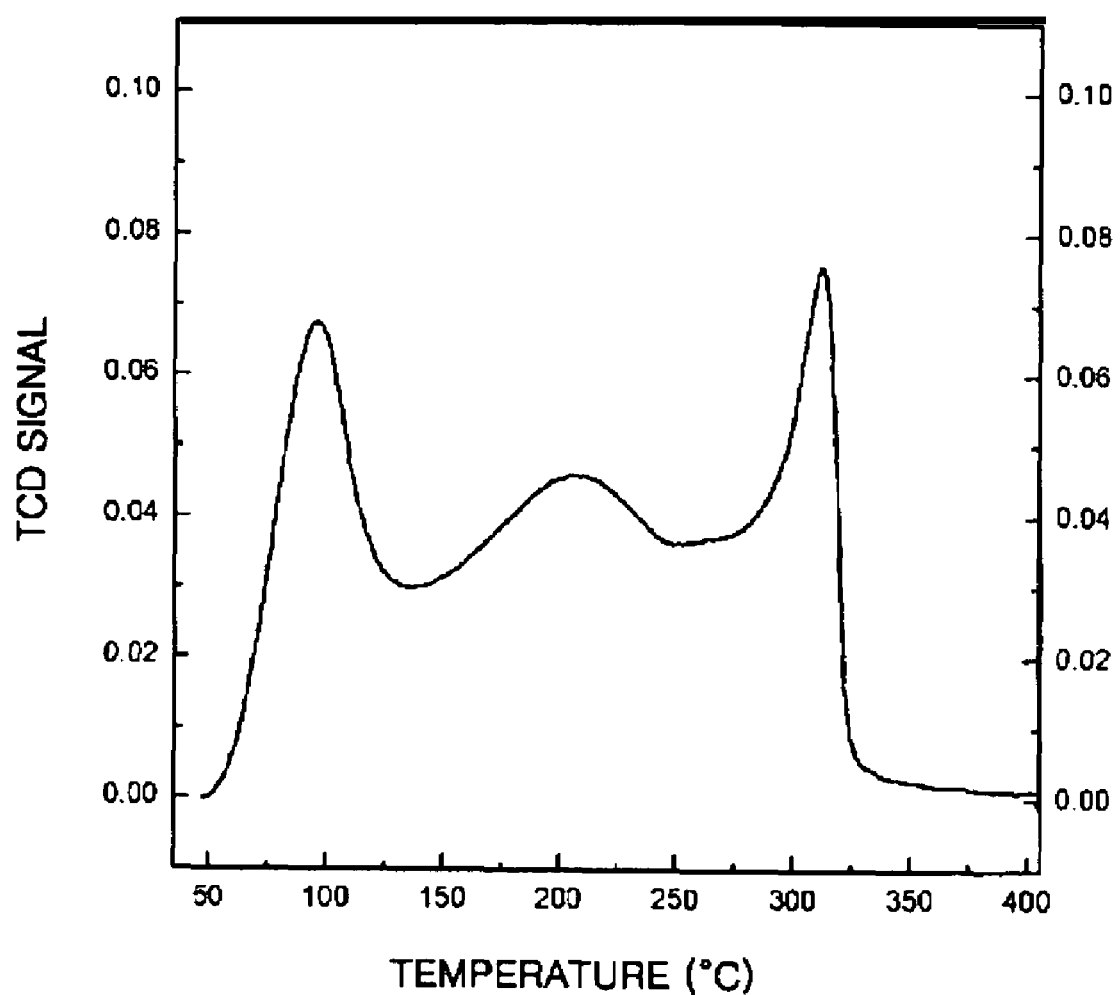
FIG. 4A is a graph showing the results of the TPD experiment practiced in Example 1 of the present invention.
Figure 4B:
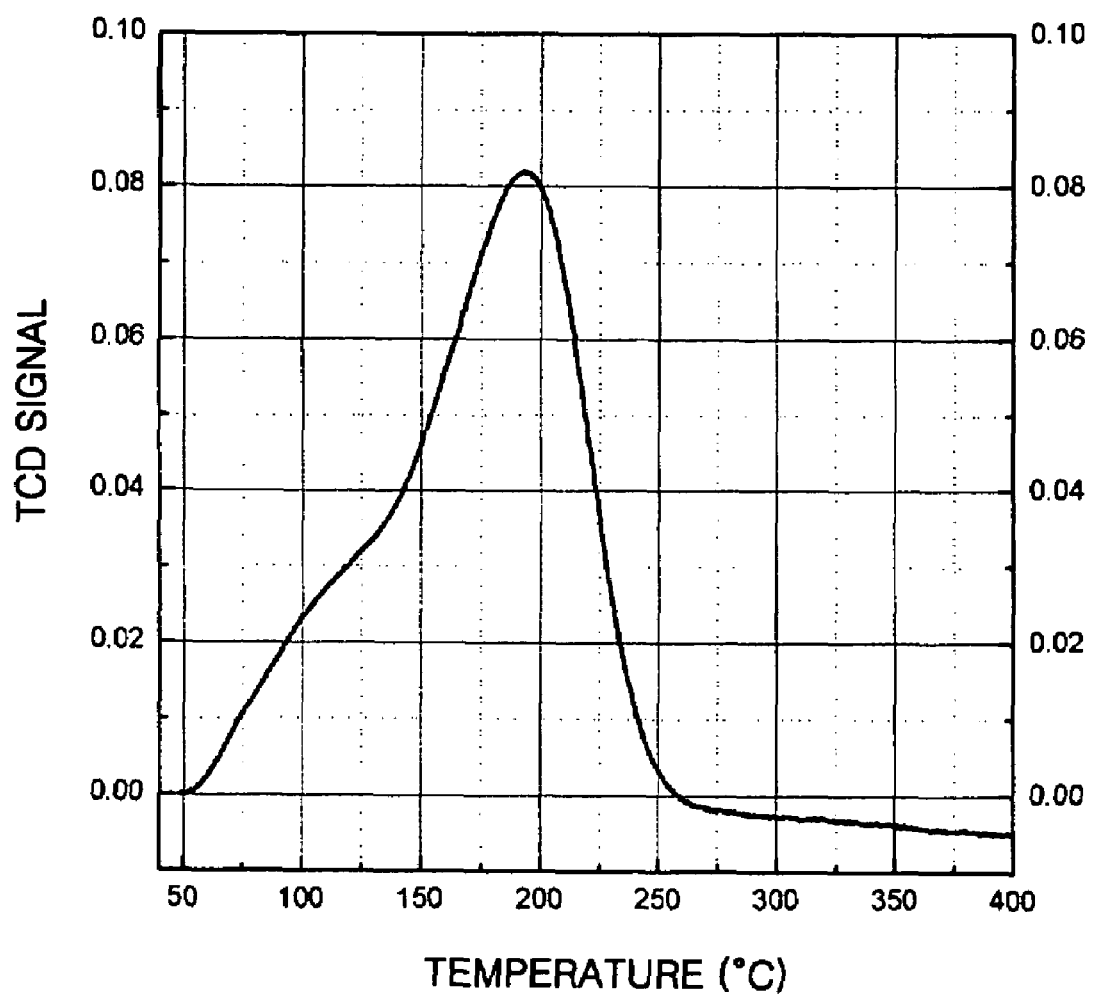
FIG. 4B is a graph showing the results of the TPD experiment practiced in Comparative Example 1.

Further, a temperature programmed desorption (TPD) experiment was performed for Example 1 and Comparative Example 1. From the experiment, the graphs as shown in FIGS. 4A and 4B could be obtained, respectively. The TPD experiment was performed in such a manner that the temperature-increasing rate was 10° C./min, and the final temperature was 400° C., and thus the experiment was ended when the temperature reached the final temperature.

Firstly, as can be seen in FIG. 4B, it can be found that, for Na—Y-zeolite, the peak of which desorption temperature is about 100° C. is overlapped with the peak of which desorption temperature is about 190° C.

Further, it can be easily found that, for the Ag—Y-zeolite shown in FIG. 4A, there is a common point in the peak position of the desorption temperature as in Comparative Example 1, since the Ag—Y-zeolite of Example 1 was originally derived from the Na—Y-zeolite of Comparative Example 1. It is assumed that the peak formed near 100° C. and near 200° C. in FIG. 4A is such a peak of the Na—Y-zeolite.

Also, it can be seen in FIG. 4A (Example 1) that there is another peak formed near 300° C. Therefore, the TPD graph with respect to Example 1 differs significantly from that of Comparative Example 1. In particular, it can be concluded that Ag—Y-zeolite has more sites capable of adsorbing THT and that these site adsorb THT more strongly. The conclusion that the sites generated by ion exchange with Ag are able to adsorb THT more strongly can be concluded from the fact that the newly generated peak is formed at higher temperatures. Thus, the binding forces between the sites to which this peak corresponds and THT is very strong.

Example 2

2 g of Na—Y-zeolite were added to 50 ml of a 0.1M $AgNO_3$ solution, and the mixture was stirred for 5 hours to perform ion exchanging while maintaining the temperature at 60° C. The ion exchanged Ag—Y-zeolite was filtered and washed with deionized water.

The washed Ag—Y-zeolite was dried for 16 hours while maintaining the temperature at 110° C. The dried Ag—Y-zeolite was added to a furnace and calcined for 4 hours while maintaining the temperature at 400° C.

The crystallinity of the Ag—Y-zeolite prepared as described above was determined as 50.0%. Further, the results from determining the amount of other components and from adsorption are summarized in Table 2 below.

Comparative Example 2

2 g of Na—Y-zeolite were added to 50 ml of a 0.5M aqueous ammonia solution, and the mixture was stirred for 5 hours to perform ion exchanging while maintaining the temperature at 60° C. The ion exchanged $NH_4$—Y-zeolite was filtered and washed with deionized water.

The washed $NH_4$-Y-zeolite was dried for 16 hours while maintaining the temperature at 110° C. The dried $NH_4$—Y-zeolite was added to a heating furnace and calcined for 4 hours while maintaining the temperature at 400° C.

2.0 g of the calcined H—Y-zeolite were added to 50 ml of a 0.1M $AgNO_3$ solution, and the mixture was stirred for 5 hours to perform ion exchanging while maintaining the temperature at 60° C. The ion exchanged Ag—Y-zeolite was filtered and washed with deionized water.

The washed Ag—Y-zeolite was dried for 16 hours while maintaining the temperature at 110° C. The dried Ag—Y-zeolite was added to a furnace and calcined for 4 hours while maintaining the temperature at 400° C.

The crystallinity of the Ag—Y-zeolite prepared as described above was determined as 27.7%. Further, the results from determining the amount of other components and from adsorption are summarized in Table 2 below.

Comparative Example 3

2 g of Na—Y-zeolite were added to 50 ml of a 0.1M $AgNO_3$ solution, and the mixture was stirred for 5 hours to perform ion exchanging while maintaining the temperature at 60° C. The ion exchanged Ag—Y-zeolite was filtered and washed with deionized water.

The washed Ag—Y-zeolite was added again to 50 ml of a 0.3M $AgNO_3$ solution, and the mixture was stirred for 5 hours to perform ion exchanging while maintaining the temperature at 60° C. The ion exchanged Ag—Y-zeolite was filtered and washed again with deionized water.

The washed Ag—Y-zeolite was dried for 16 hours while maintaining the temperature at 110° C. The dried Ag—Y-zeolite was added to a furnace and calcined for 4 hours while maintaining the temperature at 400° C.

The crystallinity of the Ag—Y-zeolite prepared as described above was determined as 32.2%. Further, the results from determining the amount of other components and from pulse chemical adsorption are summarized in Table 2 below.

TABLE 2

| | ICP | | | Cation % | | Crystallinity, | Adsorbed amount (g-THT/ |
|---|---|---|---|---|---|---|---|
| | Silica/Alumina | Na (Weight %) | Ag (Weight %) | Na | Ag | (Relative %) | g-adsorbent) |
| Ex. 2 | 5.34 | 4.72 | 13.70 | 56.18 | 43.82 | 50.0 | 0.234 |
| Comp. Ex. 2 | 5.30 | 0.20 | 14.41 | 4.91 | 95.09 | 27.7 | 0.133 |
| Comp. Ex. 3 | 5.42 | 2.41 | 22.24 | 28.73 | 71.27 | 32.2 | 0.208 |

As can be seen in Examples and Comparative Examples, it can be found that the crystallinity and the adsorbed amount of Example 2 are remarkably higher than those of Comparative Examples 2 and 3.

Comparing Example 2 with Comparative Example 2, the amounts of contained Ag are both similar. It can be found that the crystallinity of Comparative Example 2 was remarkably decreased since ion exchanging was performed several times including ammonia ion exchanging.

It can be found that, although for Comparative Example 3, the amount of Ag ion and the supported amount of Ag is more, the adsorbed amount of THT is remarkably lower compared to Example 2. It can be found from Table 2 that this results from the difference in crystallinity.

Further, comparing Example 2 with Comparative Example 3, it can be found that the amount of Ag contained in Comparative Example 3 is much more than that of Example 2. However, it can be found that the crystallinity for Example 2 is higher than that of Comparative Example 3, and that the adsorbed amount of THT for Example 2 is much more than that of Comparative Example 3.

Based on the above results, the comparison of the amount of the contained Ag, the crystallinity, and the adsorbed amount for Examples and Comparative Examples is as follows.

TABLE 3

|  | Ag (weight %) | Crystallinity, (Relative %) | Adsorbed amount (g-THT/ g-adsorbent) |
|---|---|---|---|
| Example 1 | 11.71 | 53.9 | 0.263 |
| Example 2 | 13.70 | 50.0 | 0.234 |
| Comp. Ex. 3 | 22.24 | 32.2 | 0.208 |
| Comp. Ex. 2 | 14.41 | 27.7 | 0.133 |
| Comp. Ex. 1 | — | 100.0 | 0.166 |

As can be seen in Table 3, the adsorbed amount of sulfur compound is more directly related to the crystallinity than to the amount of the contained Ag when considering the Ag—Y-zeolite only (that is, when not considering the Na—Y-zeolite of Comparative Example 1).

Particularly, it is noteworthy in comparing Comparative Examples 1 and 2, that the THT-adsorbed amount is less in Comparative Example 2, even though Comparative Example 2 contains Ag and Comparative Example 1 does not. That is, it can be found that the crystallinity of Comparative Example 1 is higher than that of Comparative Example 2, and thus the THT-adsorbed amount of Comparative Example 1 is more than that of Comparative Example 2, despite the fact that 14.41% by weight of Ag is contained in Comparative Example 2 while Ag is not contained in Comparative Example 1.

The zeolite adsorbent for desulfurization according to aspects of the present invention has excellent crystallinity over the zeolite adsorbent for desulfurization of the related art, and thus has a more excellent performance of adsorbing sulfur compounds, in spite of containing less Ag. Accordingly, when the sulfur compounds of a fuel gas are removed by employing the zeolite adsorbent for desulfurization according to aspects of the present invention, a desulfurizing device that is better even with less cost can be constructed.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A zeolite adsorbent for desulfurization comprising a Y zeolite that is ion exchanged with Ag, wherein the relative crystallinity of the Y zeolite that is ion exchanged with Ag is 45% to 98% as compared to the crystallinity of a Y zeolite that is not ion exchanged and wherein the zeolite adsorbent is made by the process of:
   calcining a Y-zeolite prior to ion exchanging the Y-zeolite;
   ion exchanging the calcined Y-zeolite one time only with a silver ion; and
   calcining the Y-zeolite that has been ion-exchanged with the silver ion.

2. The zeolite adsorbent for desulfurization according to claim 1, wherein the amount of Ag in the zeolite adsorbent is 2% to 15% by weight.

3. The zeolite adsorbent for desulfurization according to claim 1, wherein the amount of Ag ion is 1% to 40% as a percentage of total cations.

4. The zeolite adsorbent for desulfurization according to claim 1, wherein the Y zeolite is Na—Y-zeolite or H—Y-zeolite.

5. A method of preparing a zeolite adsorbent for desulfurization comprising:
   calcining a Y-zeolite prior to ion exchanging the Y-zeolite;
   ion exchanging the calcined Y-zeolite one time only with a silver ion; and
   calcining the Y-zeolite that has been ion-exchanged with the silver ion.

6. The method of preparing the zeolite adsorbent for desulfurization according to claim 5, wherein the calcining prior to the ion exchanging is performed for 2 to 12 hours at 350° C. to 500° C.

7. The method of preparing the zeolite adsorbent for desulfurization according to claim 5, wherein the calcining prior to the ion exchanging is performed in a nitrogen or air atmosphere.

8. The method of preparing the zeolite adsorbent for desulfurization according to claim 5, wherein the ion exchanging is performed for 1 to 12 hours at 20° C. to 90° C.

9. The method of preparing the zeolite adsorbent for desulfurization according to claim 5, further comprising drying the Y-zeolite exchanged with the silver ion after the ion exchanging and before the calcining that is carried out after the ion exchanging.

10. The method of preparing the zeolite adsorbent for desulfurization according to claim 5, wherein the calcining after the ion exchanging is performed for 2 to 12 hours at 350° C. to 500° C.

11. The method of preparing the zeolite adsorbent for desulfurization according to claim 10, wherein the calcining after the ion exchanging is performed in a nitrogen or air atmosphere.

12. A method of desulfurizing to remove sulfur compounds comprising passing a fuel gas through a zeolite adsorbent for desulfurization according to claim 1.

13. The method of desulfurizing according to claim 12, wherein the sulfur compounds are thiophenes, mercaptans or disulfides.

14. A desulfurizing device comprising the zeolite adsorbent for desulfurization according to claim 1.

15. The desulfurizing device according to claim 14, wherein the zeolite adsorbent for desulfurization is charged as a fixed bed.

16. A fuel processor comprising the desulfurizing device according to claim 14.

17. A fuel cell system comprising a fuel processor that comprises the desulfurization device according to claim 14, and at least one fuel cell.

18. The fuel cell system according to claim 17, wherein the zeolite adsorbent for desulfurization in the desulfurization device is charged as a fixed bed.

19. The fuel cell system according to claim 17, further comprising a guard bed comprising at least one component selected from the group consisting of activated carbon, activated alumina, silica gel, zeolite, clay, diatomous earth, porous adsorbent and mixtures thereof in the front end of a desulfurizing device comprising the zeolite adsorbent for desulfurization.

* * * * *